US005256013A

United States Patent [19]

Divone, Sr. et al.

[11] Patent Number: 5,256,013

[45] Date of Patent: Oct. 26, 1993

[54] APPARATUS AND PROCESS FOR FORMING A COSMETIC STICK

[75] Inventors: Peter A. Divone, Sr., New City, N.Y.; Jesus A. Urbaez, Waterbury, Conn.; Joseph R. Faryniarz, Oxford, Conn.; Matthew Kuznitz, Branford, Conn.; Philip A. Stone, Spring City, Pa.

[73] Assignee: Chesebrough-Pond's USA Co., Division of Conopo, Inc., Greenwich, Conn.

[21] Appl. No.: 858,725

[22] Filed: Mar. 27, 1992

[51] Int. Cl.[5] .......... B23C 3/16; B26D 1/00

[52] U.S. Cl. .......... 409/132; 83/409.2; 409/158

[58] Field of Search .......... 29/33 K, 33 P, 783, 29/33 R, 557; 83/410, 409.1, 409.2; 409/131, 158, 161, 162

[56] References Cited

U.S. PATENT DOCUMENTS

| | | | |
|---|---|---|---|
| 3,272,247 | 9/1966 | Vedvik | 83/409.2 X |
| 3,978,568 | 9/1976 | Frtdlender | 29/33 K |
| 4,237,763 | 12/1980 | Chipchase | 83/410 X |
| 4,327,616 | 5/1982 | Klvkis | 83/409.2 |
| 4,369,158 | 1/1983 | Woodruff et al. | 264/268 |
| 4,841,826 | 6/1989 | Smith, III | 83/862 |
| 5,083,486 | 1/1992 | Allison et al. | 83/409.2 X |

FOREIGN PATENT DOCUMENTS

| | | |
|---|---|---|
| 0335112 | 10/1989 | European Pat. Off. . |
| 0359905 | 3/1990 | European Pat. Off. . |

*Primary Examiner*—William Briggs
*Attorney, Agent, or Firm*—Milton L. Honig

[57] ABSTRACT

An apparatus and process is provided for shaping an end of a solid cosmetic stick. In the process the cosmetic stick is conveyed to a trimming station provided with a rotatable knife and a camming device. The device directs contact of the stick and knife over a nonlinear cutting path. The knife is rotated along the stick to remove portions thereof in a preselected fashion controlled by the camming device.

15 Claims, 4 Drawing Sheets

APPARATUS AND PROCESS FOR FORMING A COSMETIC STICK

BACKGROUND OF THE INVENTION

1. Field of the Invention

The invention concerns an apparatus and process for shaping an exposed end of a cosmetic stick.

2. Related Art

Deodorant, antiperspirant and lipstick products have the common characteristic of being comprised of a solid low-melting waxy stick composition encased in a suitable container provided with a means for urging the stick upwards through the container to expose more surface area as the stick is consumed. These cosmetic products have generally been fabricated by pouring the composition in a molten state into a suitable container equipped with a twist-up device.

Subsequent to stick fabrication, there often is a need to achieve a particular shape for the exposed end portion of the stick. Two techniques to accomplish stick end shaping are mechanical trimming and molding.

Illustrative of a molding technique is U.S. Pat. No. 4,369,158 (Woodruff et al) which describes a process wherein a pouring cup is attached to the top of a product container held in a removable manner. A twist-up device having air vents is then inserted into the still molten composition. Once cooled, the pouring cap, operating as a mold to achieve a domed shape on the exposed stick end, is thereafter removed. Among the problems of this method is the necessity for maintaining a molten state after the dome formation to accommodate insertion of the twist-up device. Additional costs are incurred because of this hot insertion. Production line speeds are also adversely impacted by the need to maintain the molten state for insertion of the twist-up device.

Alternative to molding techniques are those of mechanical trimming. Typical of mechanical trimming is EP 0 335 112 (Karavadra) wherein a solid antiperspirant stick is sculpted with a set of heated cutting edges. A precut cutting edge is oscillated in one direction to partially cut into one side of the exposed end of the stick. Rough cut and finish cut cutting edges are then arcuately passed through the end of the stick in the opposite direction. U.S. Pat. No. 4,841,826 (Smith) trims by notching a deodorant bar on one side and a rough cutter moves inwardly through the other side of the body to enter the closed end of the notch and sever body material without breaking. Thereafter a finish cutter removes relatively little material to produce a finish cut.

EP 0 359 905 (Allison et al) reports a method and apparatus for trimming solid stick deodorants wherein the stick is brought into registration with a means for raising an end thereof to a predetermined height. The stick is then transported into registration with a rotating knife to impart a rounded oval configuration to an end thereof. Thereafter the stick is transported to another conveyor means and then trimmed product is released for further packaging. A plurality of arcuate knives progressively in succession trim respective portions of the solid deodorant stick so as to provide the oval configuration.

There are several problems with the known trimming art. Single edge knives such as in EP 0 359 905 tend to trace a flat area rather than the desired oval shape. This is one reason for requiring a plurality of such blades to compensate for the limitation in providing rounded edges. Reduction in the number of blades can be accomplished by increasing the number of passes per blade over the subject stick end. Speed is, however, compromised thereby. Moreover, it is quite difficult to operate with multiple blades on wider samples because of the radius of the resultant cut; too high an arc in a finished product appears aesthetically unappealing.

The known art also suffers from the significant disadvantage that changing from one product shape to another requires significant time delay in readjusting or changing blade types.

Accordingly, it is an object of the present invention to provide an apparatus and process for shaping an end of a solid cosmetic stick that operates at a greater speed than previously achievable.

Another object of the present invention to provide an apparatus and method for shaping an end of a solid cosmetic stick that can rapidly convert between different trim profiles.

It is still another object of the present invention to provide an apparatus and method for shaping an end of a solid cosmetic stick that achieves sharper and more appealing aesthetic profiles.

These and other objects of the present invention will become more readily apparent through consideration of the embodiments that follow.

SUMMARY OF THE INVENTION

A process for shaping an end of a solid cosmetic stick supported within a container and at least partially protrudable therefrom is provided which comprises the steps of:

(i) conveying the stick supported within the container to a shaping apparatus;

(ii) registering the stick and container in alignment with a transport device for transporting the stick and container from one station to another along the apparatus;

(iii) transporting the stick and container to a trimming station provided with a knife rotating around an axis of rotation, the stick and rotating knife contacting one another over a nonlinear cutting path directed by a camming device for controlling the path;

(iv) removing portions of the cosmetic stick by cutting with the rotating knife to achieve a preselected shape directed by the camming device thereby forming a trimmed stick, the knife being rotated a multiplicity of times through 360° for each pass over the stick end, the axis of rotation being perpendicular to the cutting path; and (v) further transporting the trimmed stick from the trimming station to a conveyor device for conveying the trimmed stick away from the shaping apparatus.

Additionally, there is provided an apparatus for shaping an end of a solid cosmetic stick supported within a container and at least partially protrudable therefrom, comprising:

(i) a transporting device for gripping and moving the container with stick along the apparatus;

(ii) a knife rotating around an axis of rotation, the knife being cuttingly engageable with the end of the stick over a nonlinear cutting path; and (iii) a camming device for directing the cutting engagement of the knife and stick end over the nonlinear path.

For this invention it is particularly advantageous to employ a rotating knife with a set of blades having cutting edges on opposite sides of the knife. Additionally, the knife may be formed with a trough-shaped recess extending from the cutting edge inward toward a center of the knife. Most important to the invention is the use of a camming device which may be embodied in a cam and cam follower arrangement which can set the rotating knife on a predetermined nonlinear trajectory against the stick end. Alternatively the rotating knife can be held along a stationary axis and the stick end can be cammed along the predetermined nonlinear trajectory.

Advantageously, the knife will rotate counterclockwise as the stick end approaches thereto from a leftward position (left to right movement). Of course, when movement of the stick is viewed progressing from right to left, the knife is advantageously rotated counterclockwise.

A significant advantage of the invention is that it can be adapted to any product shape by merely changing the cam follower or through switch of the single cutter to one with a different curved profile. By contrast with known devices which may take up to a complete plant operating shift for multiple blade changeover, with the present invention the cam follower need only be repositioned or a single blade replaced which requires from as few as 15 minutes to no more than a few hours.

In trimming an oval contour, the known art requires usually more than one knife, a static blade and more than one pass over the stick to cut the profile. With the present invention, only a single knife, albeit with several blade edges, is required and only a single pass is necessary to achieve the preselected profile. Indeed, cosmetic sticks of two or more inches in width are very difficult to trim with the multiple knife procedure of the known art. The problem arises because the radius of cut required leaves too high an arc in the finished product which then appears aesthetically displeasing. With the rotating knife and cammed arrangement of the present invention, even wide samples can be accommodated.

BRIEF DESCRIPTION OF THE DRAWING

The above-noted features and objects of the present invention will become more apparent as the following description proceeds and in view of the accompanying drawing, by way of example only, wherein.

Figure 1:
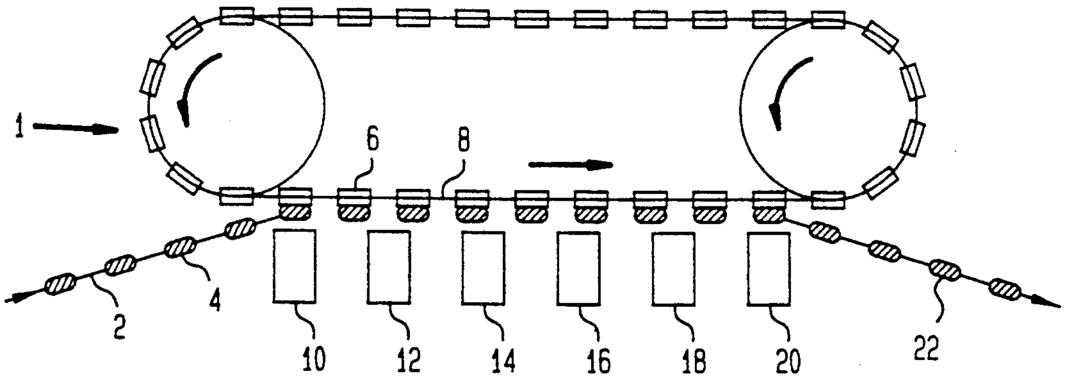
FIG. 1 is a plan view in highly schematic form of an apparatus according to the present invention suitable for shaping an end of a solid cosmetic stick.
Figure 2A:
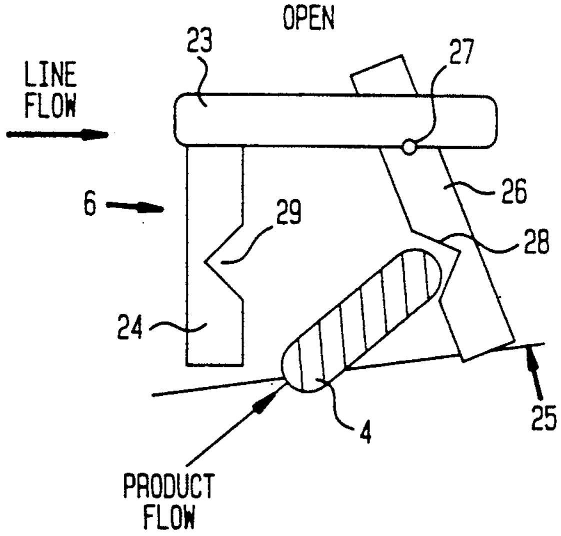
Figure 2B:
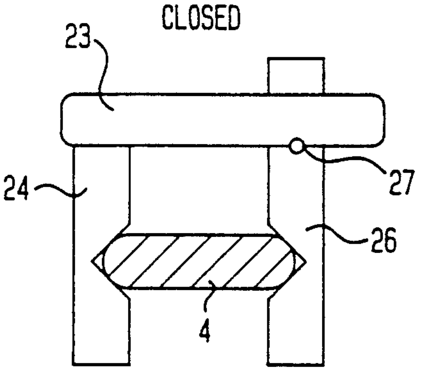
Figure 3:
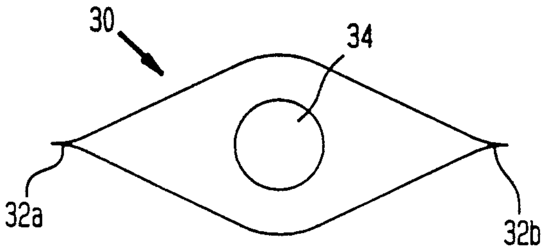
Figure 4:
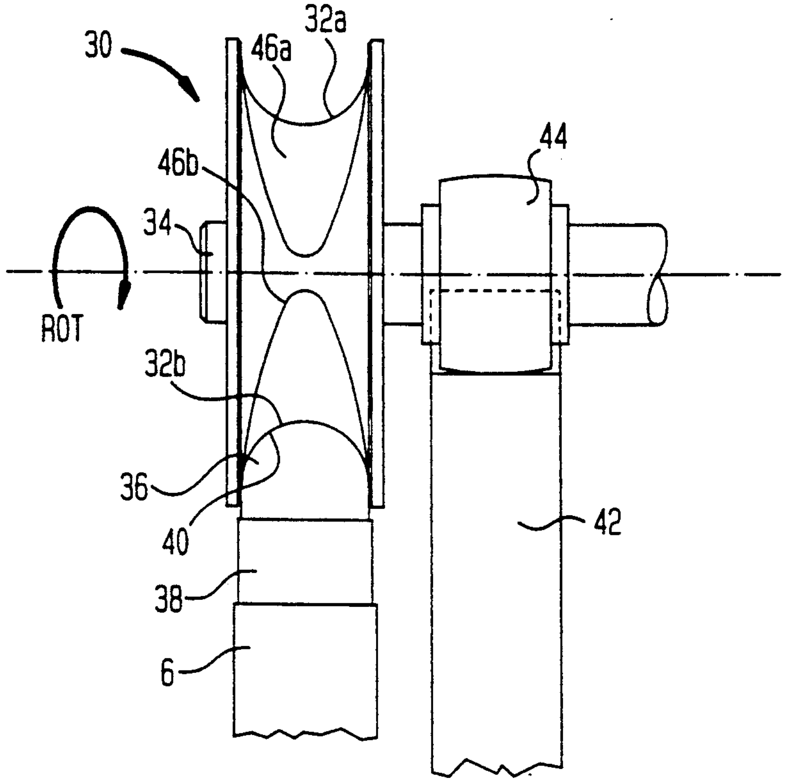
Figure 5:
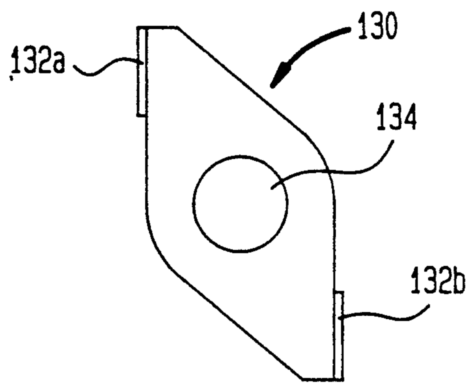
Figure 6:
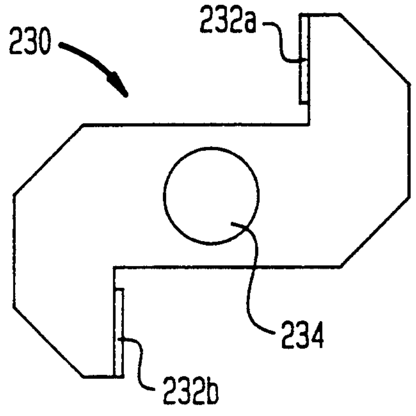
Figure 7:
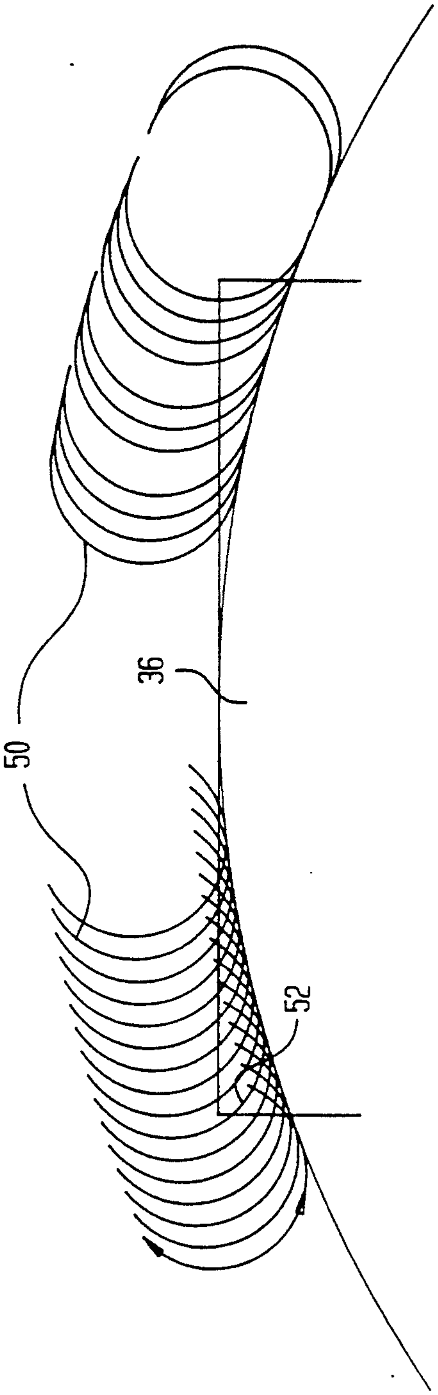
Figure 8:
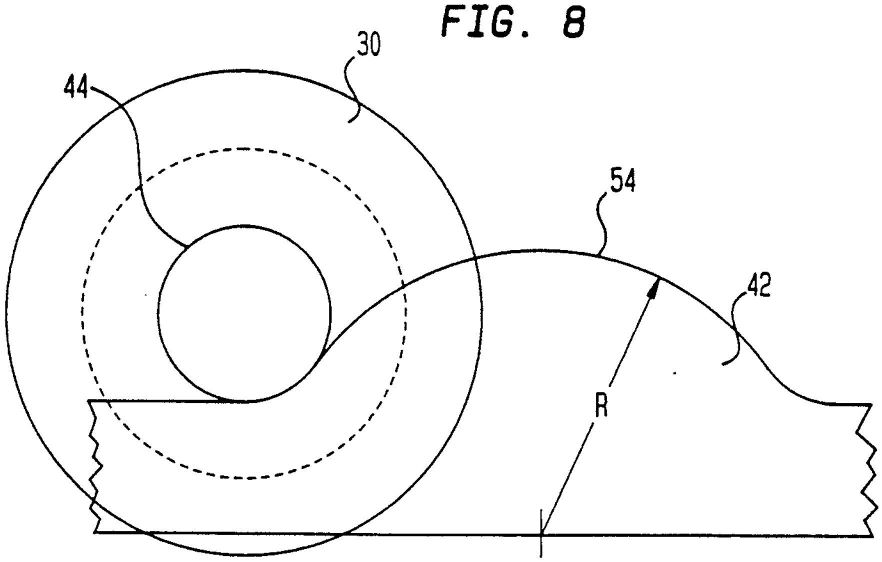
Figure 9:
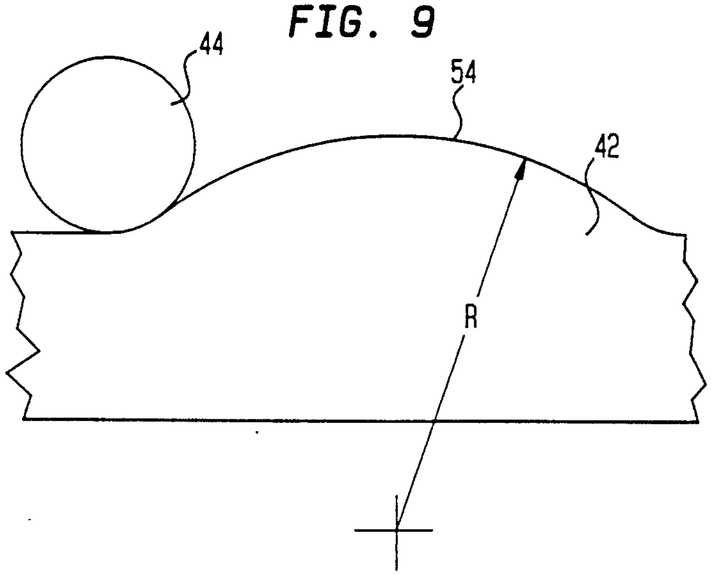
Figure 10:
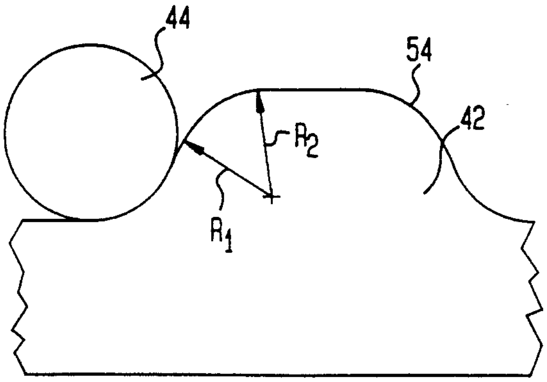

FIGS. *2a* and *2b* are a schematic plan view of a transport clamp in respective open and closed positions for conveying the cosmetic stick within the apparatus of FIG. 1;

FIG. 3 is a side view of a preferred embodiment of a knife or cutter;

FIG. 4 is a partial side-elevational view of the cutter, cam and follower arrangement according to the apparatus of FIG. 1;

FIG. 5 is an alternative embodiment in side view of a cutter for use in the apparatus according to FIG. 1;

FIG. 6 is a further embodiment of a cutter for use in the apparatus of FIG. 1;

FIG. 7 illustrates the method of material removal caused by the rotating cutter according to the apparatus of FIG. 1;

FIG. 8 illustrates a cam follower tracing a profile along a single radius high rise cam;

FIG. 9 illustrates a cam follower tracing a profile along a single radius low rise cam; and FIG. 10 illustrates a cam follower tracing a profile along a compound radius including a small radius with high rise cam.

DETAILED DESCRIPTION OF THE INVENTION

FIG. 1 presents in highly schematic form an overview of the cosmetic stick shaping apparatus according to the present invention. A conveyor 2 conveys a stick-container 4 to the shaping apparatus 1. Stick-container 4 is then brought into an area for alignment with a receiving jaw 6. A rotary transport belt 8 supports a plurality of the jaws 6 along a periphery thereof and operates to transport the stick-container 4 along various stations of the shaping apparatus. The stick-container 4 is fed into jaw 6 at a load station 10.

Subsequent to loading, the stick-container 4 is brought to a leveling station 12 where the cosmetic stick is pushed down into the container until it contacts a stop within the container. Next, there is transport to a spin-out station 14 where the cosmetic stick is caused to protrude about 1 centimeter from an edge of the container by manipulation of a propel-repel knob at a bottom end of the container. From there the spun-out product is transported to a trimming station 16. Once trimmed, there is transport to a spin-in station 18 where the protruding trimmed end of the stick is returned by reversal of the propel-repel knob fully into the container. From there, the product is sent to an unloading station 20 where jaw 6 releases the stick-container 4 to a conveyor 22 that sends the product on for final packaging within a carton or for some other finishing operation.

FIGS. *2a* and *2b* provide further detail of the loading station 10 and loading mechanism. Jaw 6 consists of a support member 23 attached to the rotary transport 8. Perpendicularly protruding from support 23 is a stationary jaw member 24 juxtaposed against an articulated movable jaw member 26, the latter being pivotal about a pivoting member 27 and connected to support 23. Conveyor 2 delivers the stick-container 4, which normally is an oval-shaped article, with the aid of a guide 25 into a receiving V-shaped or C-shaped recess 28 within movable jaw member 26. Once lodged within receiving recess 28, the movable jaw 26 closes towards stationary jaw 24, the latter being fitted with a complementary recess 29. Closure of jaw 6 results in the stick-container 4 being held within recess 28 and complementary recess 29 as illustrated in the closed position, FIG. *2b*.

FIG. 3 illustrates the cutter in the form of a knife 30 having cutting edges 32*a* and 32*b* positioned in directions that face 180° apart from one another. FIG. 4 details the cutter in conjunction with the trimming station 16. Knife 30 is mounted at a front end of a cutter drive shaft 34. Rotation of drive shaft 34 and correspondingly of knife 30 may be in the range of 5,000 to 40,000 rpm. Most advantageous is a counterclockwise rotation of the knife against the stick end as the latter moves from left to right across the cutting region; splintering of the stick is thereby avoided.

At the trimming station, the cosmetic stick 36 protruding from container 38 is brought into contact with the edges of knife 30. Stick 36 is directed across knife 30 along the profile of a cam 42 in contact with a cam follower 44 attached to drive shaft 34. An upper end 40 of stick 36 is thereby shaped in a predetermined trim pattern.

A shallow recess 46*a* and 46*b* may be associated with each of blade edges 32*a* and 32*b*. These recesses extend from the blade cutting edge inward towards the middle of the knife in the form of a shallow concave trough. The trough is useful as a relief area during sharpening of the knife.

FIGS. 5 and 6 depict alternative embodiments of the cutter. FIG. 5 shows a knife 130 rotated by a drive shaft 134. Instead of being coplaner, the blade edges 132*a* and 132*b* are placed in different but parallel planes to one another. FIG. 6 shows a knife 230 actuated by a drive shaft 234. Here the knife edges 232*a* and 232*b* are not only noncoplaner but the edges face inward toward one another.

FIG. 7 demonstrates the method of material removal caused by the rotating cutter. Cutter rotation lines 50 are shown operating on a surface of stick 36 removing portions 52 so as to define a rounded and oval end for the stick. Knife 30 rotates around an axis of rotation which is movable in a vertical plane perpendicular to the stick transport direction. Movement of the knife along the vertical plane is regulated by the cam 42 and cam follower 43. Material from the stick end can thereby be removed in a predetermined detailed profile. In this manner, very high production rates can be achieved as well as permitting cutting of very wide surfaces.

FIGS. 8 through 10 illustrate various cam configurations which are possible according to the present invention. FIG. 8 illustrates the cam 42 having a radius R along a curvature defining the cam profile 54. Drive shaft 44 rotates along cam profile 54 and thereby defines a nonlinear cutting path, in this instance with a single radius high rise profile. FIG. 9 illustrates a single radius low rise profile. FIG. 10 illustrates a compound small radius, high rise profile.

It is to be understood that the invention in its broader aspect is not limited to the specific elements shown and described, but also includes within the scope of the accompanying claims any departures made from such elements which do not sacrifice its chief advantages.

What is claimed is:

1. A process for shaping an end of a solid cosmetic stick supported within a container and at least partially protrudable therefrom comprising the steps of:

(i) conveying the stick supported within the container to a shaping apparatus;

(ii) registering the stick and container in alignment with a transport device for transporting the stick and container from one station to another along the apparatus;

(iii) transporting the stick and container to a trimming station provided with a knife rotating around an axis of rotation, the stick and rotating knife contacting one another over a nonlinear cutting path directed by a camming device for controlling the path;

(iv) removing portions of the cosmetic stick by cutting with the rotating knife to achieve a preselected shape directed by the camming device thereby forming a trimmed stick, the knife being rotated a multiplicity of times through 360° for each pass over the stick end, the axis of rotation being perpendicular to the cutting path; and (v) further transporting the trimmed stick from the trimming station to a conveyor device for conveying the trimmed stick away from the shaping apparatus.

2. A process according to claim 1 wherein the rotating knife has a pair of blades, each at opposite ends of the knife.

3. A process according to claim 2 wherein outward cutting edges of each of the blades face away from one another.

4. A process according to claim 2 wherein outward cutting edges of the blades face toward one another.

5. A process according to claim 1 wherein a substantially U-shaped trough-like recess extends from an outer cutting edge of a blade of the knife inward toward a center of the knife.

6. A process according to claim 1 wherein the camming device operates to move the rotating knife over the nonlinear path.

7. A process according to claim 6 wherein the rotating knife is movable only in a vertical plane perpendicular to a direction of stick transport.

8. A process according to claim 1 wherein the camming device operates to move the stick over a nonlinear path.

9. A process according to claim 1 wherein the knife rotates counterclockwise as the stick end is transported from left to right to engage the knife.

10. A process according to claim 1 wherein the knife rotates clockwise as the stick end is transported from right to left to engage the knife.

11. An apparatus for shaping an end of a solid cosmetic stick supported within a container and at least partially protrudable therefrom, comprising:

(i) a transporting device for gripping and moving the container with stick along the apparatus;

(ii) a knife rotating around an axis of rotation, the knife being cuttingly engageable with the end of the stick over a nonlinear cutting path; and (iii) a camming device for directing the cutting engagement of the knife and stick end over the nonlinear path.

12. An apparatus according to claim 11 wherein the rotating knife has a pair of blades, each at opposite ends of the knife.

13. An apparatus according to claim 12 wherein outward cutting edges of each of the blades face away from one another.

14. An apparatus according to claim 12 wherein outward cutting edges of the blades face toward one another.

15. An apparatus according to claim 12 wherein a trough-like recess extends from an outer edge of a blade of the knife inward toward a center of the knife.

* * * * *